United States Patent Office 3,698,959
Patented Oct. 17, 1972

3,698,959
METHOD OF FORMING MERCURIC OXIDE SHELL ON CARBON PARTICLES
Robert O. Weiss, West Milford, N.J., and Robert A. Nikitopoulos, Carmel, and Phillip B. Gunther, Hastings-on-Hudson, N.Y., assignors to P. R. Mallory & Co., Indianapolis, Ind.
No Drawing. Filed May 14, 1970, Ser. No. 37,354
Int. Cl. H01m 15/06
U.S. Cl. 136—137
2 Claims

ABSTRACT OF THE DISCLOSURE

Nucleated mercuric oxide is formed on carbon particles of controlled particle size, each of which serves as a nucleus and conductive carrier for the mercuric oxide formed thereon as a shell.

This invention relates to the production of nucleated mercuric oxide, formed on carbon particles of controlled particle size, with each carbon particle serving as a nucleus for the mercuric oxide layer formed thereon as a shell.

One object of the invention is to provide a process for reacting mercury bichloride and sodium hydroxide in a solution with aluminum chloride and carbon particles, from which the nucleated mercuric oxide on carbon particles is precipitated.

Another object of the invention is to provide the foregoing process in which the dimensions of the nucleated particles are controlled by controlling the pH concentration of the solution.

Nucleated mercuric oxide thus formed on carbon nucleuses has many advantages.

(1) Such oxide has increased electrical conductivity since the carbon is in intimate contact with HgO particles, and can produce higher short circuit currents.

(2) Such oxide has higher energy producing efficiency. Since carbon is the nucleus of the particle, the conversion of the particle to Hg during discharge will take place from the inside as well as from the outside, thereby utilizing more material at useful discharge levels.

(3) Such oxide has an advantage in its handling, since it reduces or eliminates the need for dust control equipment, due to the fact that the material is partially or wholly premixed at the source of manufacture. The degree to which the material is premixed depends upon the type depolarizer to be made. The carbon, being attached to the HgO particle, will not be allowed to "classify" or become free, to create a dust problem.

(4) Further, with such oxide, higher densities of cell depolarizer can be realized. This could be used to create higher energy capacity per volume in cells, and extend machine and tool life as lower forces are required to achieve normal densities. This, of course, indicates lower maintenance and associated costs.

The mercuric oxide is produced in this process by forming a solution of mercury bichloride and one of sodium hydroxide, then adding carbon and aluminum chloride to these solutions. The nucleated mercuric oxide is precipitated in a controlled pH combination of the two.

The mercury is first oxidized by chlorine in a glassed, steel, jacketed vessel, charged with a quantity of water. The water is processed thru a commercial softener to remove those impurities which become an insoluble layer in the process and is chilled to increase the solubility of chlorine. This reduces and controls the reaction time in oxidizing the mercury. Chilled water is also circulated thru the jacket to control the temperature of the solution in the vessel. A calculated amount of sodium chloride in solution, one pound to three gallons total, is added to the solution in the vessel, to increase the solubility of mercury bichloride so that a concentration of 20% may be attained. Metallic mercury is introduced to the vessel at a controlled rate and circulated thru the solution to be chlorinated, the quantity being the amount needed for a 20% solution. Chlorine gas is metered into the vessel and bubbled thru the solution so as to be brought into contact with the mercury. The vessel is a closed system, and a positive pressure is maintained, the amount determined by the rate of reaction desired. When the reaction is complete the chlorine is shut off and the solution brought to boiling for a short time to purge the system of unused chlorine gas. The material is then pumped over to a rubber lined storage tank, in which the temperature is maintained by introduction of live low pressure steam into the tank.

A quantity of aluminum chloride and carbon is added to the tank at this time. The aluminum chloride is added to control the precipitation rate and particle size of the mercuric oxide. The carbon is added to provide a nucleus for the mercuric oxide particle to be formed.

Separately, a 6% or 7% solution of caustic soda is made by diluting concentrated sodium hydroxide, which may be done in a jacketed black iron vessel equipped with an agitator. The caustic soda is mixed and heated to 160° F., and is maintained at this temperature while being used.

The mercury bichloride and other chemicals in the solution in the transfer tank, previously mentioned, are metered into a precipitation tank along with the dilute caustic soda. The pH in that precipitation tank is controlled to produce the desired reaction by the addition of sufficient sodium hydroxide to maintain a pH range of 10.5 to 12.0. The temperature is maintained at the boiling point of 210 degrees Fahrenheit and the solution is agitated. The result is a precipitation of mercuric oxide with a carbon nucleus of controlled particle size. The precipitated material is then washed, dried, and packaged for shipment to destination.

Thus, by this process, a desirable end product is provided that has many features and advantages in the battery field. Variations in the procedure may be made without departing from the spirit and scope of the invention.

What is claimed is:

1. A process for producing nucleated mercuric oxide as a shell on carbon particles comprising: oxidizing mercury with chlorine in a pressure controlled vessel charged with water to form a first solution having mercury bichloride therein; adding sodium chloride to said first solution to increase solubility of the mercury bichloride, transferring said first solution to a separate tank, adding aluminum chloride and carbon particles to said first solution, maintaining the temperature of said first solution by passing steam into said tank, forming a second solution of dilute sodium hydroxide, metering said first and second solutions into a precipitation tank to form a mixture, controlling the pH of said mixture within the range of 10.5 to 12.0 and holding the temperature of the mixture to 210 degrees Fahrenheit to cause the precipitation of the nucleated particles.

2. A process for producing nucleated mercuric oxide as a shell on carbon particles comprising: oxidizing mercury with chlorine in a pressure controlled vessel charged with water to form a first solution having mercury bichloride therein; adding sodium chloride to said first solution to increase solubility of the mercury bichloride to attain a concentration of 20%, transferring said first solution to a separate tank, adding aluminum chloride and carbon particles to said first solution, maintaining the temperature of said first solution by passing steam into said tank, forming a second solution of dilute sodium hydroxide having a concentration of 6 to 7%, metering said first and second solutions into a precipitation tank to form a mixture, controlling the pH of said mixture within the range of 10.5 to 12.0 and holding the temperature of the mixture to 210 degrees Fahrenheit to cause the precipitation of the nucleated particles.

References Cited

UNITED STATES PATENTS 3,424,552  1/1969  Cadmus _____ 23—183

FOREIGN PATENTS 1,148,760  4/1969  Great Britain _____ 136—139

DONALD L. WALTON, Primary Examiner

U.S. Cl. X.R.

23—183